(12) United States Patent
Roske et al.

(10) Patent No.: US 11,104,218 B2
(45) Date of Patent: Aug. 31, 2021

(54) FUEL TANK DRAIN PLUG

(71) Applicant: Clark Equipment Company, West Fargo, ND (US)

(72) Inventors: Craig R. Roske, Lincoln, ND (US); Russell Honeyman, Bismarck, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 48 days.

(21) Appl. No.: 16/555,491

(22) Filed: Aug. 29, 2019

(65) Prior Publication Data

US 2020/0070647 A1  Mar. 5, 2020

Related U.S. Application Data

(60) Provisional application No. 62/725,453, filed on Aug. 31, 2018.

(51) Int. Cl.
| | | |
|---|---|---|
| B60K 15/03 | (2006.01) | |
| B60K 15/063 | (2006.01) | |
| E02F 9/08 | (2006.01) | |
| E02F 3/34 | (2006.01) | |

(52) U.S. Cl.
CPC ........ B60K 15/03 (2013.01); B60K 15/03006 (2013.01); B60K 15/063 (2013.01); E02F 3/3414 (2013.01); E02F 9/0883 (2013.01); *B60K 2015/03447* (2013.01); *B60K 2015/03473* (2013.01); *B60K 2015/03486* (2013.01); *B60K 2015/0638* (2013.01)

(58) Field of Classification Search
CPC .......... B60K 2015/03473; B60K 15/03; B60K 15/03006
See application file for complete search history.

(56) References Cited

U.S. PATENT DOCUMENTS

| | | | | |
|---|---|---|---|---|
| 4,178,004 A * | 12/1979 | Shinoda | ................ | B60K 15/06 137/264 |
| 4,386,596 A * | 6/1983 | Tuckey | .................. | F02M 31/16 123/557 |
| 6,953,527 B2 * | 10/2005 | Brower | ............... | B01D 35/027 210/172.2 |
| 7,507,131 B2 * | 3/2009 | Schaefer, Jr. | ...... | B01D 21/0003 440/88 F |
| 7,681,556 B2 * | 3/2010 | Hwang | .............. | F02M 37/0047 123/510 |
| 7,854,345 B2 * | 12/2010 | Kallevig | ................ | B60K 15/04 220/562 |
| 8,616,403 B2 * | 12/2013 | Hisadomi | .............. | B60K 15/01 220/562 |
| 9,487,080 B2 * | 11/2016 | Teter | ......................... | F16K 1/52 |
| 9,493,051 B2 * | 11/2016 | Bills | ...................... | B60K 15/03 |

(Continued)

*Primary Examiner* — Jeffrey J Restifo
(74) *Attorney, Agent, or Firm* — John Veldhuis-Kroeze; Westman, Champlin & Koehler, P.A.

(57) ABSTRACT

Power machine fuel tanks include a plug receptacle and a cover for the plug receptacle which seals the plug receptacle from an interior of the fuel tank. A receptacle insert positioned within the plug receptacle allows a fuel plug to be removably secured to the fuel tank. The cover prevents leakage from inside the fuel tank through the plug receptacle, regardless of whether the plug is secured within the receptacle insert, unless the cover has been removed from a sealing position.

4 Claims, 24 Drawing Sheets

(56) References Cited

U.S. PATENT DOCUMENTS

| | | | | |
|---|---|---|---|---|
| 9,567,729 B2* | 2/2017 | Sumiyoshi | ............... | B60K 5/02 |
| 10,792,997 B2* | 10/2020 | Bosch | .................... | B60K 15/03 |
| 10,858,803 B2* | 12/2020 | Durkin | .................. | E02F 9/0866 |

* cited by examiner

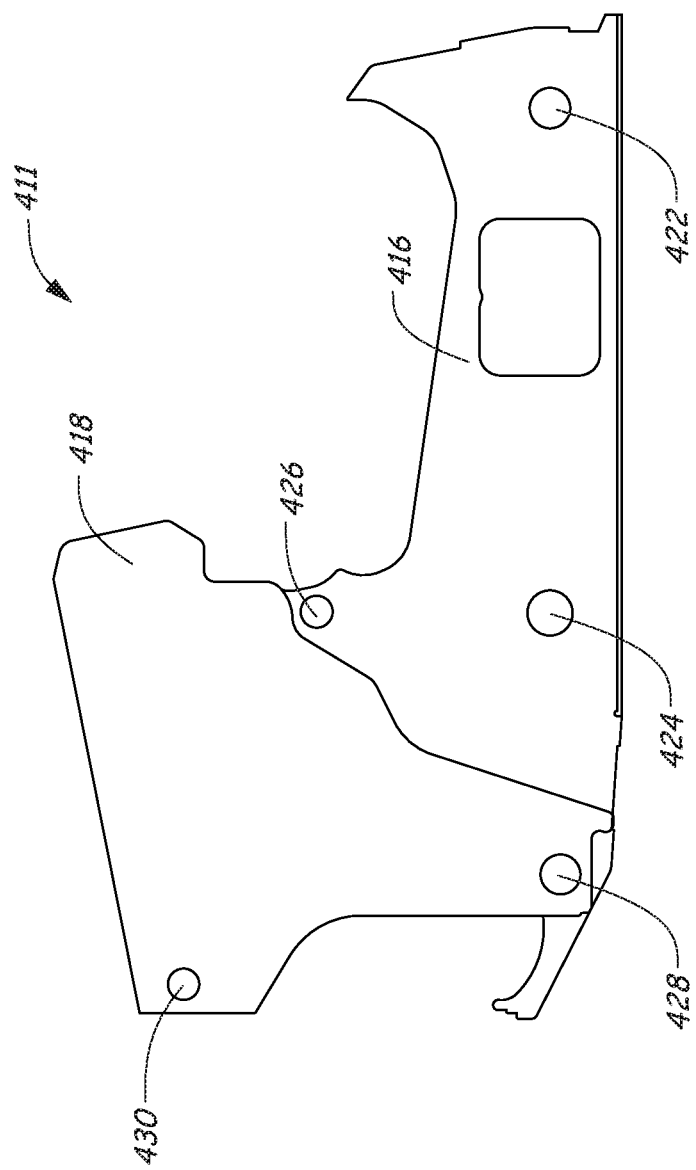

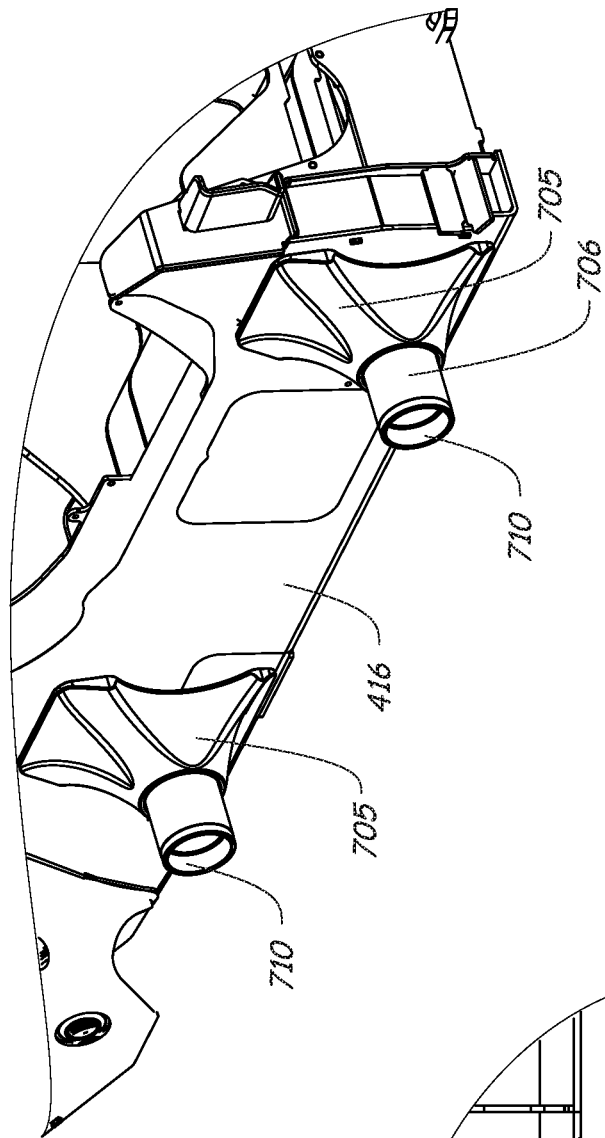
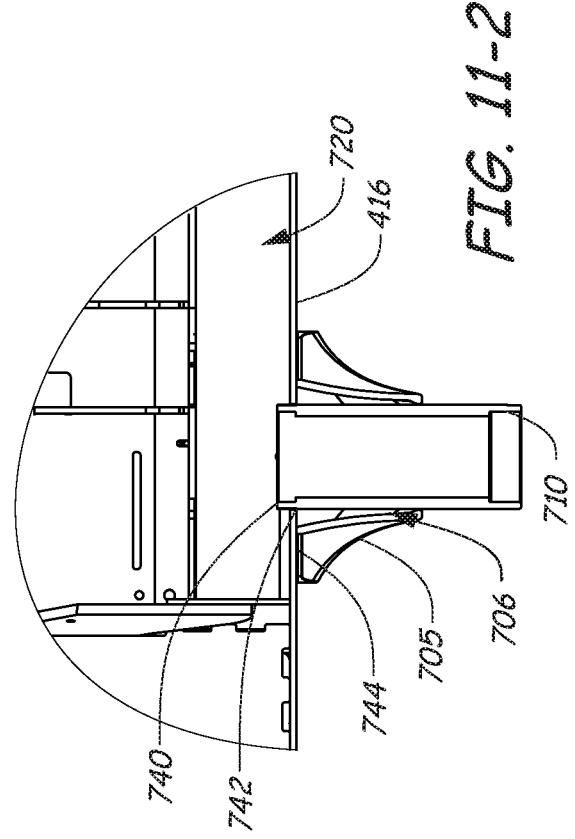

FUEL TANK DRAIN PLUG

CROSS-REFERENCE TO RELATED APPLICATION

This application claims the benefit of U.S. Provisional Application No. 62/725,453, which was filed on Aug. 31, 2018.

BACKGROUND

The present disclosure is directed toward power machines. More particularly, the present disclosure is related to fuel tanks of power machines such as loaders. Power machines, for the purposes of this disclosure, include any type of machine that generates power for accomplishing a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Power machines typically include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Fuel tanks typically include drain plugs to allow for removal of fuel from the tank, for example, if the fuel was contaminated in some way. Drain plugs are frequently susceptible to leaking. Given that the likelihood of any tank having to be drained during the life of a vehicle is relatively small, the inclusion of a drain plug that might leak often causes more problems than it solves.

The discussion above is merely provided for general background information and is not intended to be used as an aid in determining the scope of the claimed subject matter.

SUMMARY

This Summary and the Abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Disclosed embodiments include power machine fuel tanks, and corresponding power machines such as skid steer loaders, which include features allowing a drain plug to be included without any potential leakage in the event that the drain plug is not needed for drainage of the fuel tank. The fuel tanks include a plug receptacle and a cover for the plug receptacle which seals the plug receptacle from an interior of the fuel tank. A receptacle insert positioned within the plug receptacle allows a fuel plug to be removably secured to the fuel tank from the outside. The cover prevents leakage from inside the fuel tank through the plug receptacle, regardless of whether the plug is secured within the receptacle insert, unless the cover has been removed from a sealing position, for example using a punch-out process.

One general aspect in some disclosed embodiments includes a fuel tank assembly for a power machine, including: a molded fuel tank (590; 690); a plug receptacle (695) formed in a bottom portion of the fuel tank; a molded cover (698) formed inside the fuel tank above the plug receptacle (695) and sealing an interior of the fuel tank from the plug receptacle; a receptacle insert (694) positioned inside of the plug receptacle (695); and a fuel plug (699) configured to be removably secured within the receptacle insert (694); where the molded cover prevents leakage from inside the fuel tank through the plug receptacle, regardless of whether the plug is secured within the receptacle insert, unless the molded cover has been removed from a sealing position.

Implementations may include one or more of the following features. The fuel tank assembly where the plug receptacle (695) is formed in a drain well (693) to allow drainage of fuel in the fuel tank. The fuel tank assembly where the molded fuel tank is made of polymeric material. The fuel tank assembly where the molded fuel tank (590; 690) and molded cover (698) are formed in a same molding process such that the fuel tank and molded cover are formed of a continuous piece of polymeric material.

Another general aspect in some disclosed embodiments includes a power machine (100; 200; 400) including: an engine (593) positioned in an engine compartment at a rear of the power machine; a lift arm structure (230); a frame (110; 210; 410) having a first upright portion (214A; 214B) configured to support pivot connections for the lift arm structure and having a first side panel (418) and a second side panel (510) outwardly offset from the first side panel, the frame forming an internal compartment (625) in the first upright portion at a rear of the power machine and to a side of the engine compartment, the internal compartment (625) formed between the first side panel (418), the second side panel (510), a front compartment wall (560) extending between the first and second side panels, and a rear compartment wall (570), the internal compartment being accessible from the engine compartment; and a fuel tank (590; 690) positioned at least partially within the internal compartment (625).

Implementations may include one or more of the following features. The power machine where the fuel tank (590; 690) has a first portion (591; 691) positioned within the internal compartment (625) and a second portion (592; 692) positioned outside of the internal compartment next to or beneath the engine (593). The power machine where the fuel tank is made of polymeric material. The power machine where the fuel tank includes: a molded fuel tank (590; 690); a plug receptacle (695) formed in a bottom portion of the molded fuel tank; a molded cover (698) formed inside the molded fuel tank above the plug receptacle (695) and sealing an interior of the molded fuel tank from the plug receptacle; a receptacle insert (694) positioned inside of the plug receptacle (695); and a fuel plug (699) configured to be removably secured within the receptacle insert (694); where the molded cover prevents leakage from inside the molded fuel tank through the plug receptacle, regardless of whether the plug is secured within the receptacle insert, unless the molded cover has been removed from a sealing position. The power machine where the plug receptacle (695) is formed in a drain well (693) of the molded fuel tank to allow drainage of fuel in the molded fuel tank. The power machine where the molded fuel tank is made of polymeric material. The power machine where the molded fuel tank (590; 690) and molded cover (698) are formed in a same molding process such that the molded fuel tank and molded cover are formed of a continuous piece of polymeric material.

BRIEF DESCRIPTION OF THE DRAWINGS

FIGS. 4-4A are side view illustrations of a power machine frame in accordance with an exemplary embodiment.

FIGS. 7-1 through 7-3 are perspective views of a bushing casting shown in FIG. 6.

FIGS. 8-1 and 8-2 are perspective views of another bushing casting shown in FIG. 6.

FIGS. 10-1 and 10-2 are perspective views of a fuel tank and placement of the fuel tank in the power machine frame.

FIG. 10-3 is a perspective view of a fuel tank in accordance with an alternate embodiment including a drain plug feature with a molded-over drain plug receptacle.

FIG. 10-4 is an outside perspective view of the bottom of the fuel tank shown in FIG. 10-3, with an insert positioned in the receptacle and configured to receive a drain plug.

FIG. 10-5 is an inside perspective view of the bottom of the fuel tank shown in FIG. 10-3, showing a molded portion covering the drain plug receptacle.

FIG. 10-6 is an outside perspective view of the bottom of the power machine frame with an access panel removed to show the bottom of the fuel tank, the receptacle insert and a drain plug positioned in the receptacle insert.

FIG. 10-7 is a cross-sectional illustration of a portion of the fuel tank showing one exemplary embodiment of the molded portion covering the drain plug receptacle.

FIGS. 11-1 through 11-4 are perspective and top view illustrations of a portion of the power machine frame, and further illustrating a cast axle tube support for an axle tube extending from a split chain case housing within the frame.

FIGS. 14-1 through 14-3 are illustrations of a motor carrier having a cantilevered wedge brake for use with the split chain case of the power machine according to one illustrative embodiment.

DETAILED DESCRIPTION

The concepts disclosed in this discussion are described and illustrated with reference to exemplary or illustrative embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed embodiments are directed to power machines fuel tanks, and corresponding power machines such as skid steer loaders. The power machine fuel tanks include disclosed features which prevent fuel tank leakage while still providing a drain plug for any potential need to drain the tank.

Figure 2:
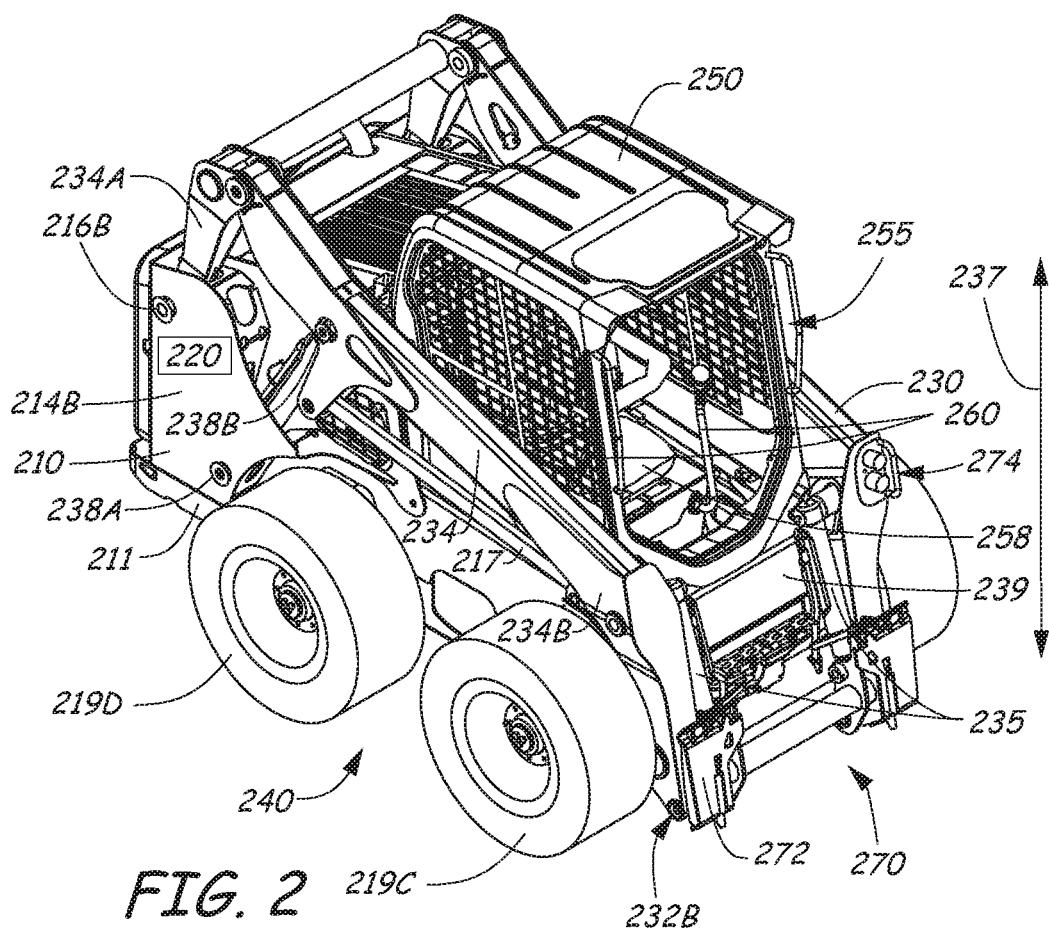
FIG. 2 is a front perspective view of a power machine of the type on which embodiments disclosed herein can be advantageously practiced.
Figure 3:
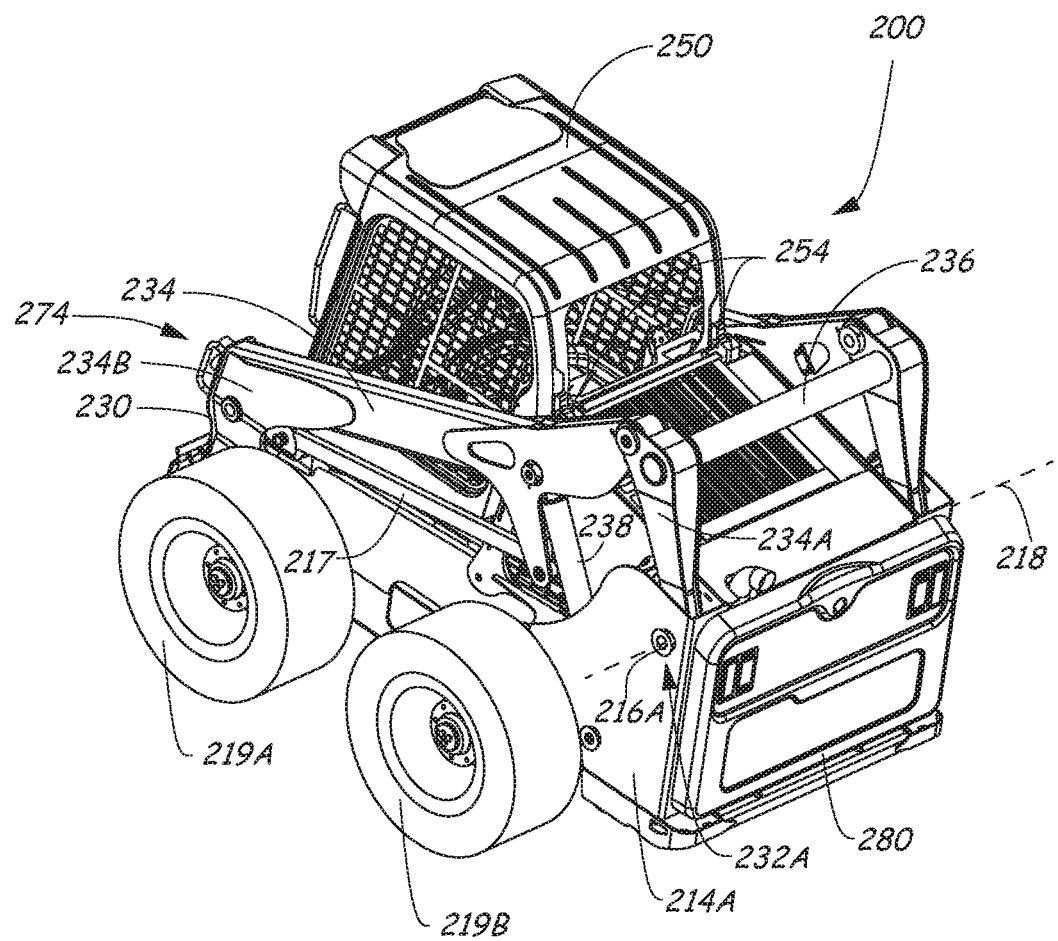
FIG. 3 is a rear perspective view of the power machine shown in FIG. 2.

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. However, as mentioned above, the embodiments below can be practiced on any of a number of power machines, including power machines of different types from the representative power machine shown in FIGS. 2-3.

Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
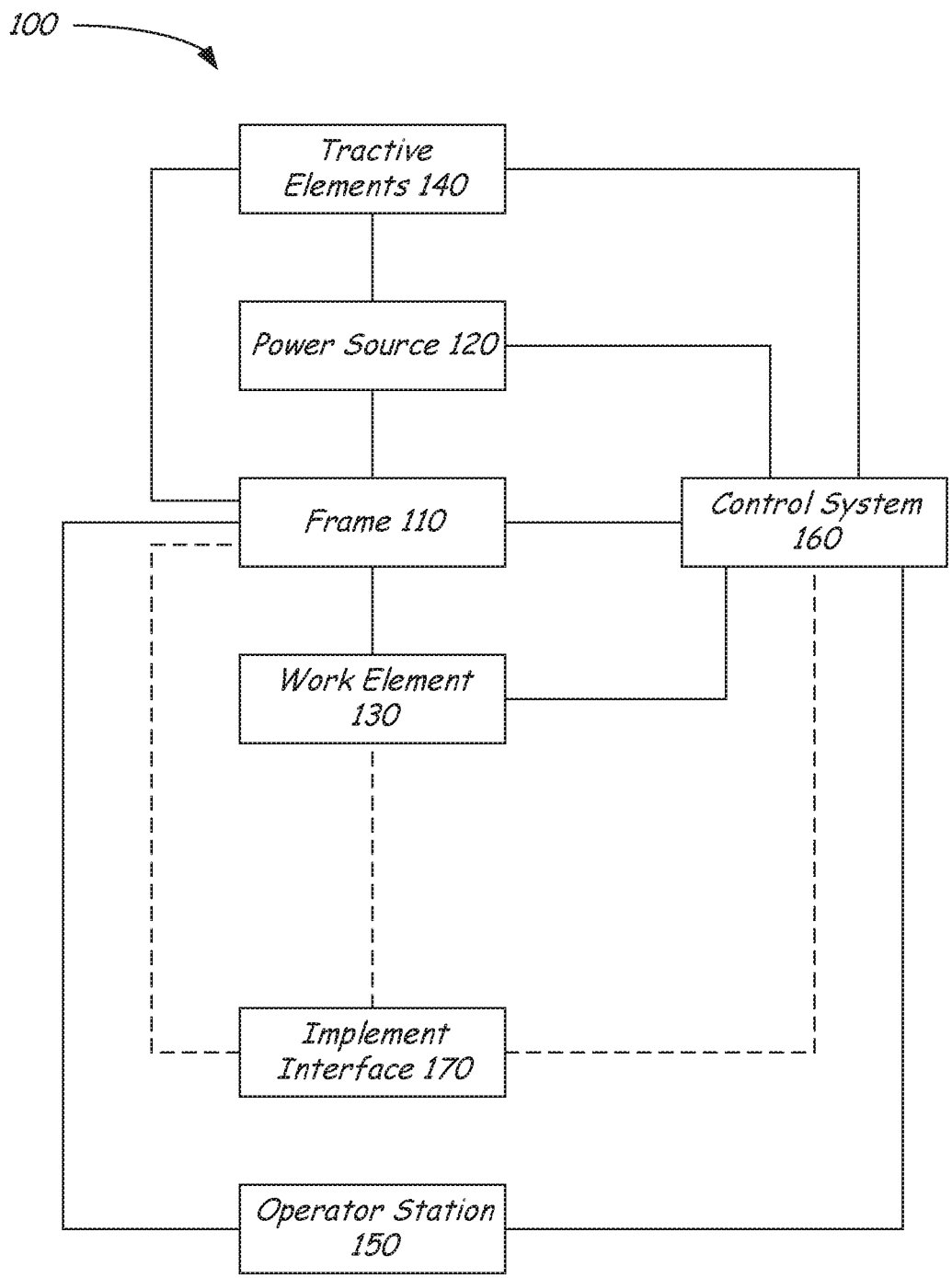
FIG. 1 is a block diagram illustrating functional systems of a representative power machine on which embodiments of the present disclosure can be advantageously practiced.

FIG. 1 shows a block diagram illustrating the basic systems of a power machine 100 upon which the embodiments discussed below can be advantageously incorporated and can be any of several different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of various different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is capable of providing power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that are capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote-control device can be provided (i.e. remote from both the power machine and any implement to which is it coupled) that is capable of controlling at least some of the operator controlled functions on the power machine.

FIGS. 2-3 illustrates a loader 200, which is one example of the power machine 100 illustrated in FIG. 1 where the embodiments discussed below can be advantageously employed. Loader 200 is a skid-steer, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Track loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220 that is capable of generating or otherwise providing power for operating various functions on the power machine. Power system 220 is shown in block diagram form, but is located within the frame 210. Frame 210 also supports a work element in the form of a lift arm assembly 230 that is powered by the power system 220 for performing various work tasks. As loader 200 is a work vehicle, frame 210 also supports a traction system 240, powered by power system 220 for propelling the power machine over a support surface. The power system 220 is accessible from the rear of the machine. A tailgate 280 covers an opening (not shown) that allows access to the power system 220 when the tailgate is an opened position. The lift arm assembly 230 in turn supports an implement interface 270 that provides attachment structures for coupling implements to the lift arm assembly.

Frame 210 of loader 200 includes an undercarriage or lower portion 211 of the frame and a mainframe or upper portion 212 of the frame that is supported by the undercarriage. The mainframe 212 of loader 200 is attached to the undercarriage 211 such as with fasteners or by welding the undercarriage to the mainframe. Mainframe 212 includes a pair of upright portions 214A and 214B located on either side and toward the rear of the mainframe that support lift arm structure 230 and to which the lift arm structure 230 is pivotally attached. The lift arm structure 230 is illustratively pinned to each of the upright portions 214A and 214B. The combination of mounting features on the upright portions 214A and 214B and the lift arm structure 230 and mounting hardware (including pins used to pin the lift arm structure to the mainframe 212) are collectively referred to as joints 216A and 216B (one is located on each of the upright portions 214) for the purposes of this discussion. Joints 216A and 216B are aligned along an axis 218 so that the lift arm structure is capable of pivoting, as discussed below, with respect to the frame 210 about axis 218. Other power machines may not include upright portions on either side of the frame, or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports tractive elements in the form of wheels 219A-D (collectively, 219) on either side of the loader 200.

Various power machines that are capable of including and/or interacting with the embodiments discussed below can have various different frame components that support various work elements. Frame 210 illustrated in FIGS. 2 and 3 is illustrative of a power machine frame. However, power machine frames and components discussed below with reference to FIGS. 5-17 differ in some respects with features shown in frame 210. Those of skill in the art will recognize that other embodiments of frame 210 and power machine 200 include some or all frame features as described in FIGS. 5-17.

Returning to FIGS. 2-3, the loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair. The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

Implement interface 270 is located proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Loader Frame Side Panels

Figure 4:
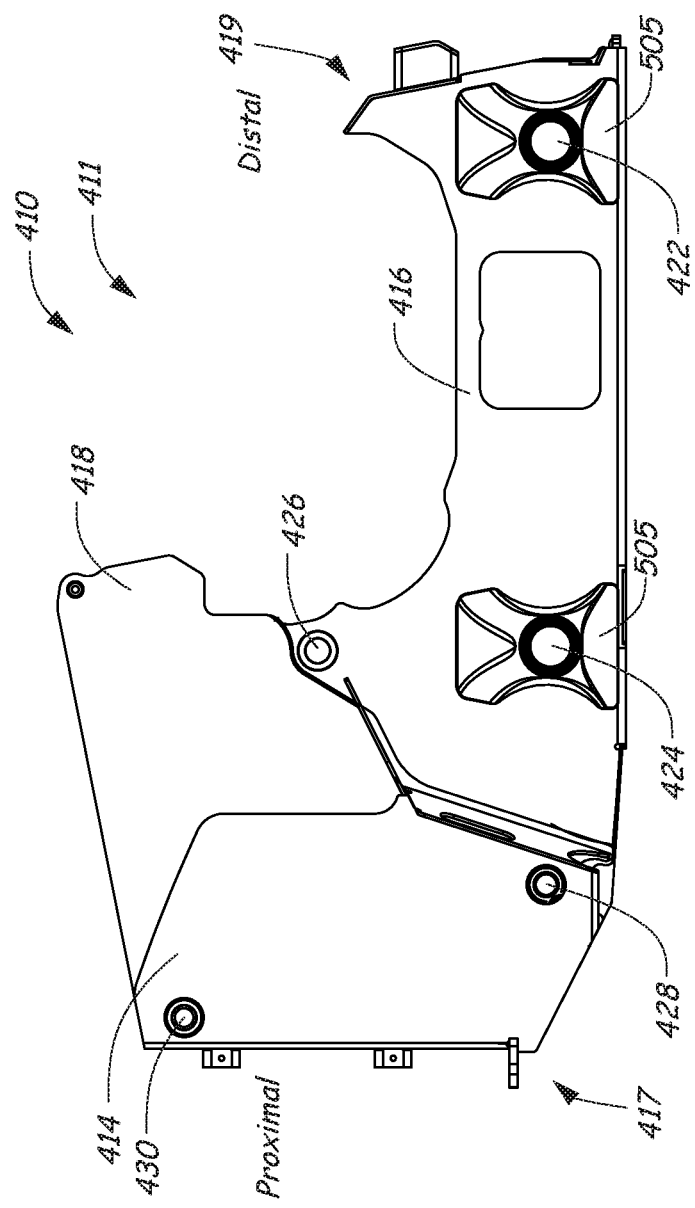

FIG. 4 is a side view illustration of a portion 411 of a frame 410 for a power machine 400 such as the power machines that are discussed above and shown in FIGS. 1-3. While frame 410 is particularly configured as a frame of a wheeled skid-steer loader such as shown in FIGS. 2-3, some features of frame 410 can be used in other loader types such as a tracked skid-steer loaders or other loaders. The portion 411 of frame 410 shown in FIG. 4 corresponds generally to a right side of a loader frame such as is shown FIGS. 2-3 and FIG. 4 is view from a right-hand side of the portion 411 of frame 410. Frame 410 also includes a left-hand side (not shown in FIG. 4) that is a substantially similar but mirror image or near mirror-image of the right-hand side.

Frame portion 411 includes two primary panels, first panel 416 that extends generally horizontally from a proximal end 417 toward a distal end 419 and a second panel 418 that is positioned generally toward the proximal end 417 and extends generally vertically. As will be discussed in more detail below, the first panel 416 and the second panel 418 are attached to each other and are generally planar to each other. Frame portion 411 also includes an outer upright portion 414 that is positioned toward the proximal end 417 and is spaced outboard of the first and second panels 416 and 418 to create a pocket in which connections to a lift arm and lift arm actuator are operably coupled to the frame 410.

To improve the manufacturability and dimensional consistency of the frame 410 of power machine 400, first panel 416 includes two axle apertures 422 and 424 establishing the wheel base of the power machine, and at least one lift arm position indexing aperture 426 formed in the panel such as by laser cutting the apertures into the panel. By having these apertures in a unitary piece of material as opposed to in different pieces of material that are fastened together such as by welding, the relative position of each axle location and a lift arm location are capable of being held in a tighter tolerance than might be achieved when such apertures are formed into separate pieces of material that are welded together. More particularly, panel 416 includes two lift arm position indexing apertures 426 and 428 (best seen in FIG. 5). Apertures 422, 424, 426 and 428 can be, for example, laser cut or otherwise formed into single panel 416 to very closely control alignment and tolerances. In some exemplary embodiments, lift arm position indexing aperture 426 is a driver or control link pivot aperture, while aperture 428 is a lift cylinder aperture. By having first and second axle apertures 422 and 424, and at least one lift arm position indexing aperture 426 formed, for example by laser cutting, into a single panel 416 of frame 410, alignment of corresponding components during the manufacturing or assembly process can be improved and simplified.

Second panel 418 of the side wall or upright portions 414 can also include lift arm position indexing apertures 428 and 430 for use in rotatably coupling lift arm follower link pivots, lift cylinder pivots, etc. Further, in some embodiments, apertures can be formed in both of panels 416 and 418 such that the apertures align when the two panels are welded together. For example, aperture 428 is illustrated in both of panels 416 and 418. Likewise, in some alternative embodiments, aperture 426 can be formed in both of panels 416 and 418 as well. Also shown in FIG. 4 are axle tube supports 505 surrounding axle apertures 422 and 424. Axle tube supports 505 are used to support axle tubes in a split chain case design discussed below in greater detail. Axle tube supports 505 in some embodiments are formed by casting, but in other embodiments can be formed using other techniques including welding multiple parts together. FIG. 4A shows side panels 416 and 418 without any other components. In this embodiment, panel 418 is welded to panel 416 and is positioned outboard of the panel 416.

Figure 5:
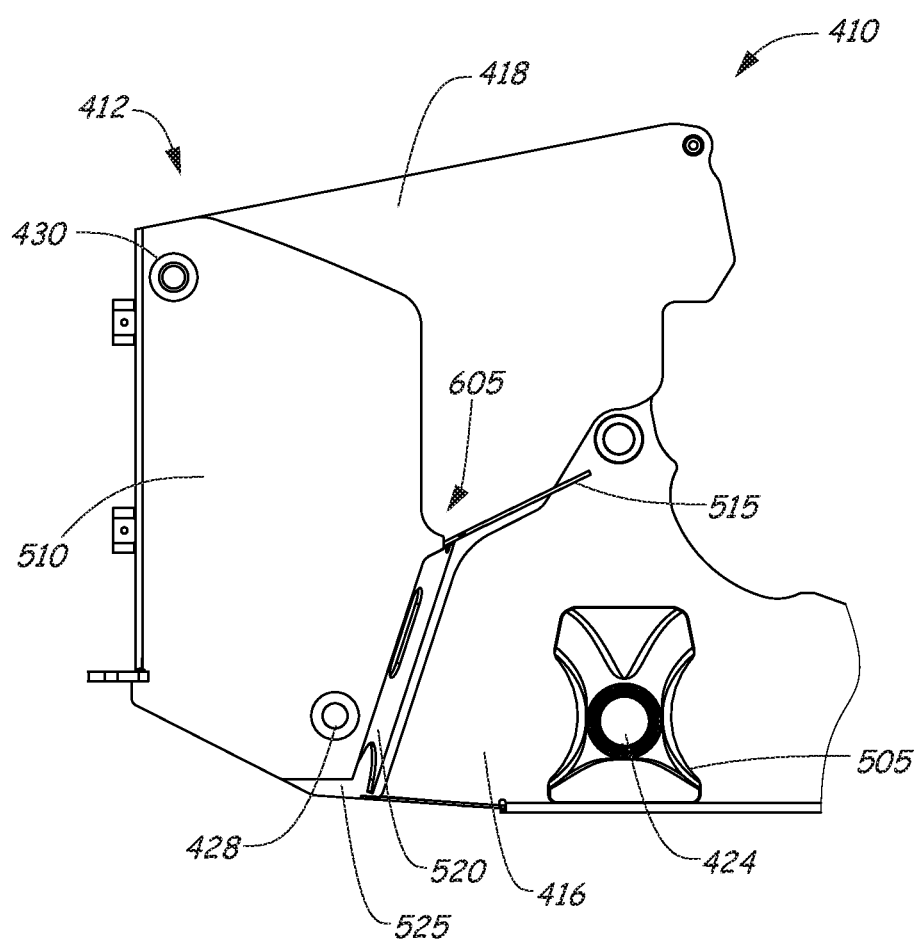
FIG. 5 is a side view illustration of a portion of the frame of FIG. 4.
Figure 6:
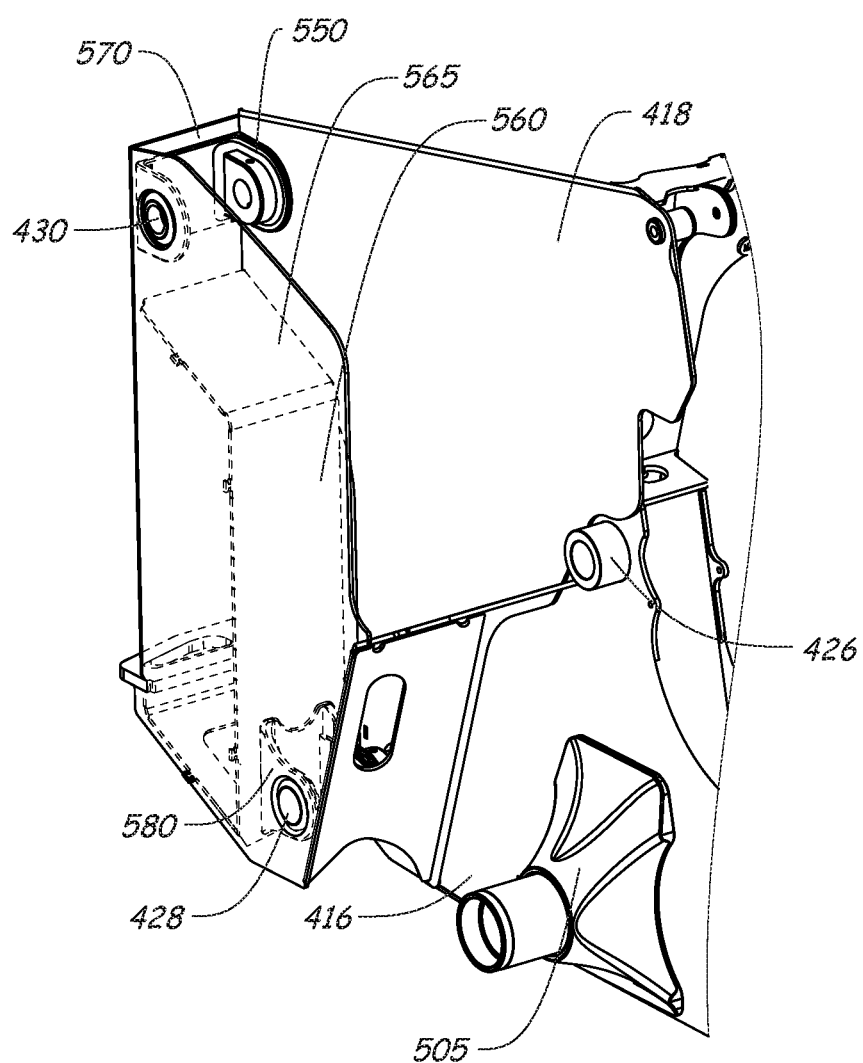
FIG. 6 is a perspective side view of a portion of the power machine frame shown in FIG. 4.

FIGS. 5 and 6 are side and perspective views, respectively, of main frame portion 411 of frame 410 illustrating additional features in accordance with exemplary embodiments. Frame portion 411 includes a side panel 510 outwardly offset from panel 418 and connected to panel 418 in part by a fender including, in the embodiment shown, an upper fender portion 515 and a lower fender portion 520. Other embodiments can include a fender with any number of portions or segments. The front compartment wall 560, top compartment wall 565, and rear compartment wall 570 also connect the side panel 510 and the panel 418. In some embodiments including as shown in FIG. 6, rear compartment wall 570 is formed by bending side panel 510. Side panel 510, panel 418, front compartment wall 560 and top compartment wall 565 form an upright that supports structures such as pivot castings 550 and 580. Pivot castings 550 and 580, discussed in more detail below, provide mounting locations for the lift arm structure such as lift arm structure 230 illustrated in FIGS. 2-3 and a lift arm actuator such as cylinder 238 in FIGS. 2-3.

In some exemplary embodiments, the lower fender portion 520 is angled rearward relative to upper fender portion 515, to encourage debris from the tire in front of it to slide off the fender and not collect on the fender. To allow cleanout of debris collected on the fender, lower fender portion 520 does not include a lip along its lower edge and extending rearward as would typically be the case in conventional power machine frames. Further, the rearward angled orientation and positioning of lower fender portion 520 relative to upper fender portion 515 allows debris to more easily exit opening 525 at the bottom of the partially enclosed area.

Pivot Bushing Castings

Figures 1, 7:
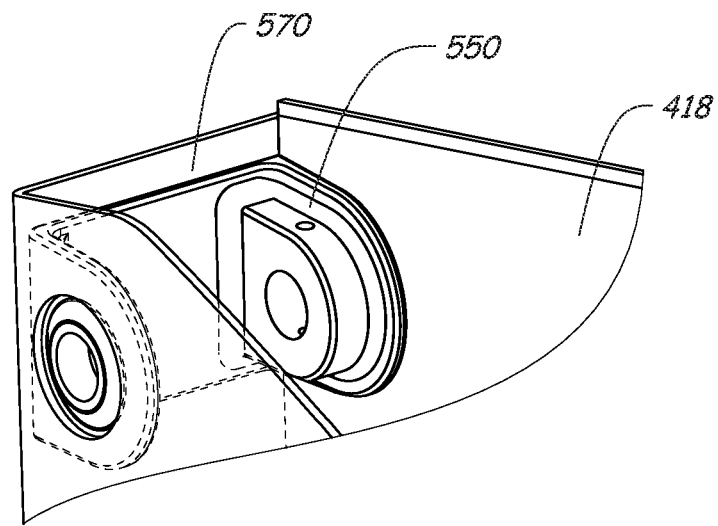
Figures 2, 7:
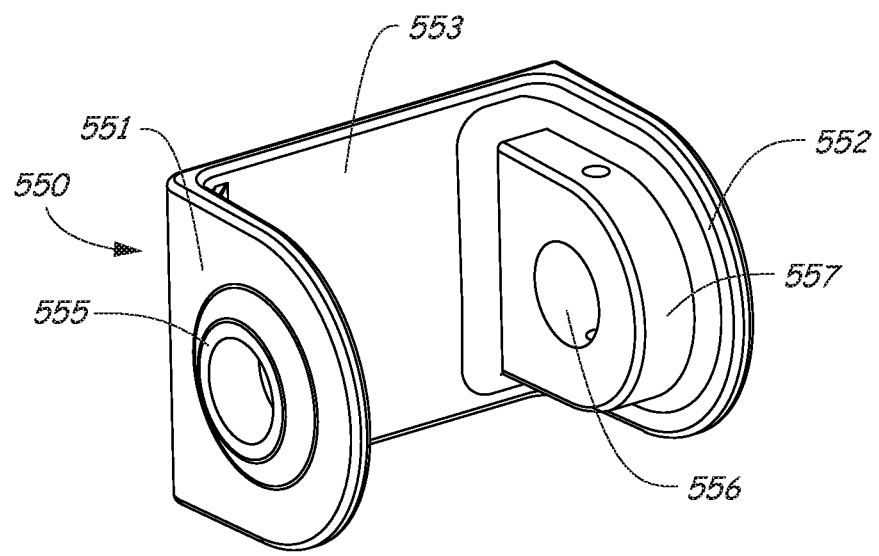
Figures 3, 7:
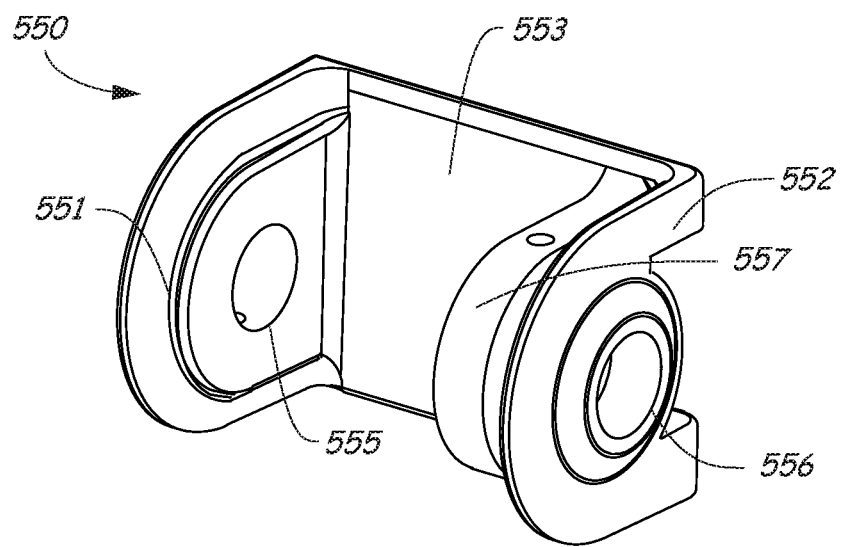

FIGS. 6-7 illustrate castings 550 and 580 that provide the pivot bushings for carrying pins to attach a lift arm structure and lift actuator to the frame. Castings 550 and 580 are mounted to align with apertures 428 and 430, respectively, with casting 580 providing a pivot joint for accepting connection of a lift cylinder to the frame, and casting 550 providing a pivot joint for accepting connection of a lift arm structure to the frame. Pivot castings 550 and 580 are welded to upper frame portion 412 between second panel 418 and side panel 510, with casting 550 being welded above top compartment wall 565. In some exemplary embodiments, apertures 430 and 428 are formed in both of panel 418 and side panel 510 to facilitate assembly of the frame with castings 550 and 580, but in other embodiments, apertures 430 and 428 need only extend through one of panel 418 and side panel 510. For example, a pin can be slid into the castings from one side panel, allowing only one panel aperture to be used.

FIGS. 7-1 through 7-3 show perspective views of pivot casting 550 in accordance with some exemplary embodiments. FIG. 7-1 illustrates the pivot casting as mounted to panel 418 and rear upright wall 570 (with side panel 510 being removed in FIG. 7-1 to allow for better visibility of pivot casting 550), while the casting 550 is shown separate from any frame components in FIGS. 7-2 and 7-3. It should be noted that in some embodiments, pivot casting 550 is not attached to the rear upright wall 570 but in other embodiments, the pivot casting is attached to the rear upright wall by welding. In some of these embodiments, the pivot casting 550 is mounted to the top compartment wall 565, although not shown in FIG. 6. In other embodiments, the size of the frame is such that the pivot casting can be positioned directly on the top compartment wall and, in some cases welded to the top compartment wall. As shown, pivot casting 550 includes first and second casting side walls 551 and 552 configured and shaped to respectively interface with side panel 510 (shown for example in FIG. 6) and second panel 418. Casting side walls 551 and 552 are separated by rear casting wall 553. Side wall 552 includes bushing 557 having an aperture 556 formed therein such as by machining and aligned with an aperture 555 formed in side wall 551. Sidewall 551 can include a larger thickness of material around aperture 555, which can act as a bearing surface so that apertures 555 and 556 provide first and second bearing surfaces for carrying a pin that is inserted into the apertures to pivotally connect a member (such as a cylinder or a lift arm) to a frame to which the pivot casting is attached. Apertures 555 and 556 are aligned with lift arm position lift arm structure indexing aperture 430 formed in side panel 510 and/or in second panel 418. As discussed above, it is not critical that both of panels 510 and 418 include apertures corresponding to the bearing surfaces provided by apertures 555 and 556. Instead, it is most important that the bearing surfaces are properly aligned with each other. By having a cast part for carrying a pin for mounting a pivoting member to a frame, better dimensional control of the alignment of bearing apertures 555 and 556 is achieved than otherwise would be if bushings were welded to the frame.

Figures 1, 8:
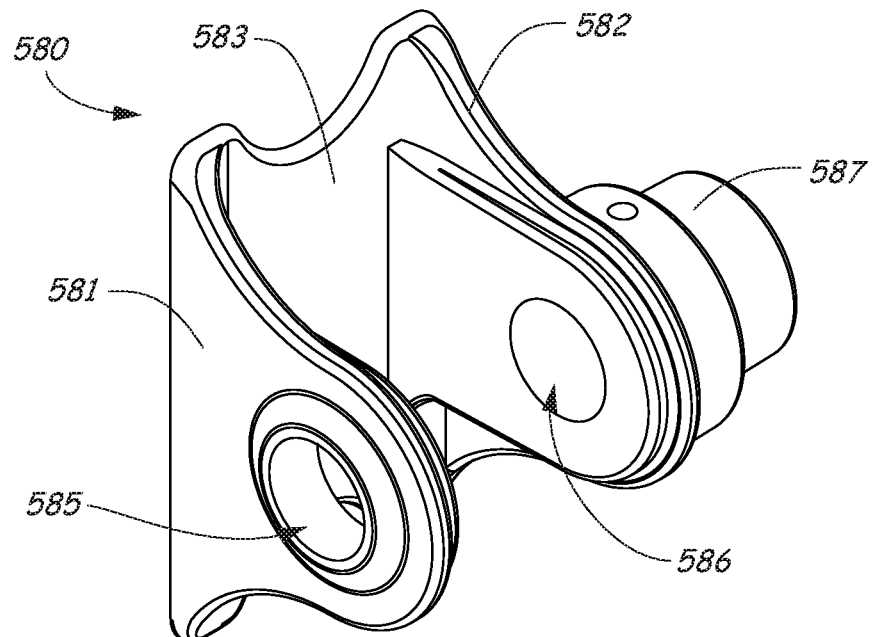
Figures 2, 8:
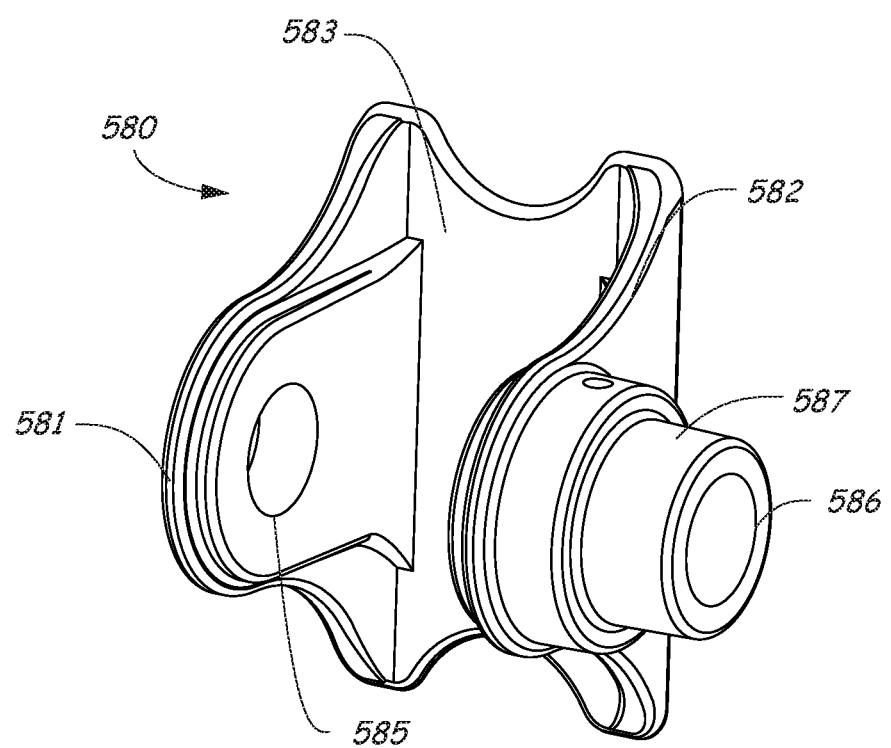

FIGS. 8-1 and 8-2, illustrate perspective views of pivot casting 580 in accordance with additional embodiments. Although as shown in the figures and discussed below, pivot casting 580 is somewhat different from casting 550, in some embodiments pivot casting 580 is substantially similar to casting 550. Pivot casting 580 includes first and second casting side walls 581 and 582 configured and shaped to respectively interface with side panel 510 and second panel 418. Casting side walls 581 and 582 are separated by a rear casting wall 583. Side wall 582 includes bushing 587 having an aperture 586 extending therethrough and aligned with an aperture 585 in side wall 581. Apertures 585 and 586 provide first and second bearing surfaces similar to the apertures 555 and 556 discussed above. Apertures 585 and 586 are aligned with lift cylinder indexing aperture 428 formed in side panel 510 and/or in second panel 418. Once again, it is not critical that both of panels 510 and 418 include apertures corresponding to the bearing surfaces provided by apertures 585 and 586. Instead, it is most important that the bearing surfaces are properly aligned with each other. Casting 580 provides better control of this alignment between bearing apertures 585 and 586 by having a connection between the two, i.e., rear casting wall 583.

When manufacturing frame 410, a casting 550 can be welded to side panel 510, second panel 418, top compartment wall 565 and, in some cases, rear compartment wall 570. A casting 580 can be welded to side panel 510, second panel 418 and/or to front compartment wall 560, although it need not be welded to front compartment wall 560. Similar or identical castings can be welded in corresponding positions on the opposite side of the machine. By providing single castings having pairs of apertures 555/556 or 585/586 providing bearing surfaces which are easily alignable with apertures in the frame panels (e.g., apertures 428 or 430) prior to welding, use of castings 550 and 580 helps to minimize misalignment of pins in comparison to conventional frames in which pairs of bushings are separately welded to the frame.

Fuel Tank

Figure 9:
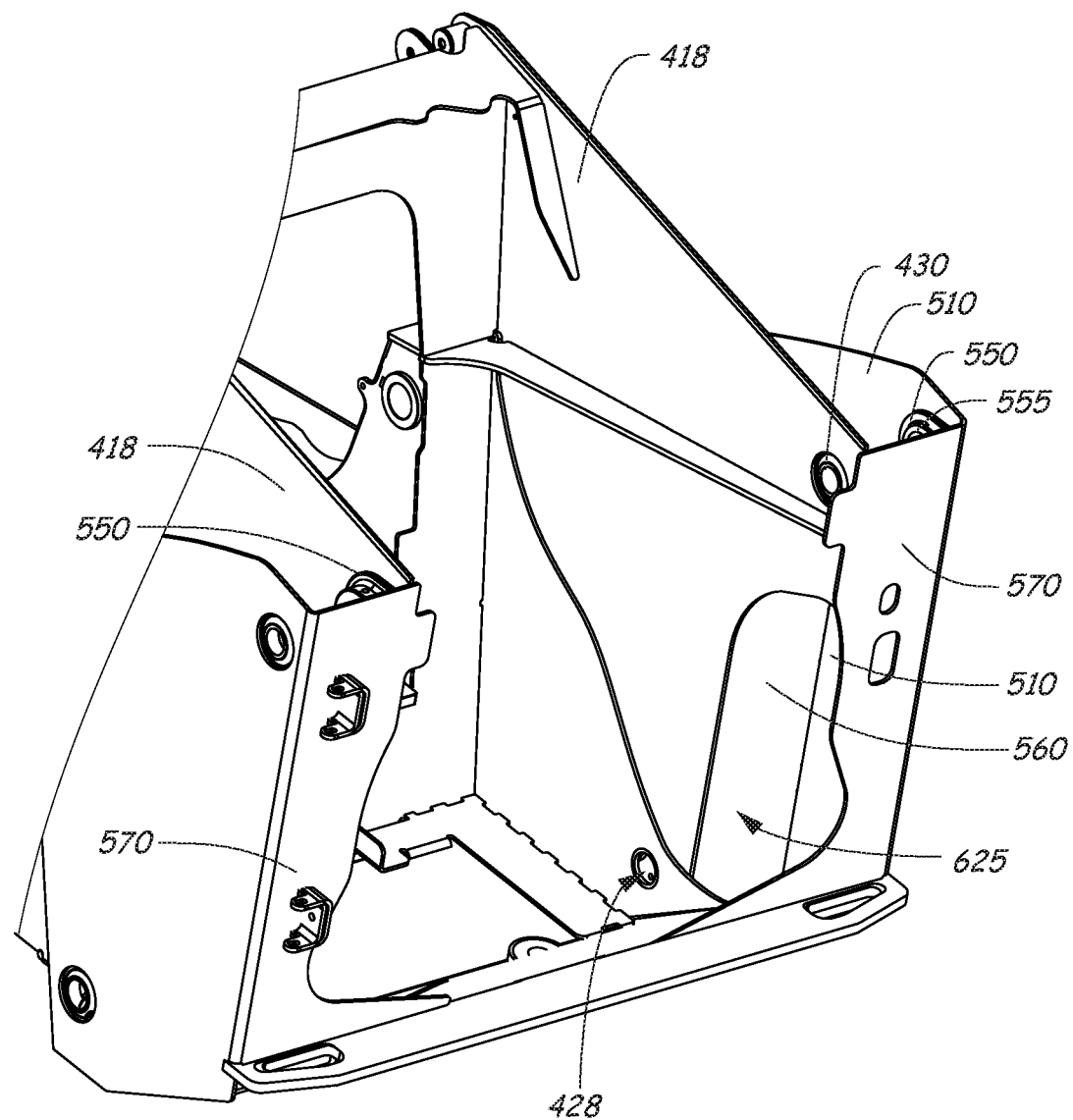
FIG. 9 is a rear perspective view of a portion of the power machine frame shown in FIGS. 4-6.

Referring now to FIG. 9, shown is a rear perspective view of frame 410 in accordance with some exemplary embodiments. As shown in FIG. 9, front compartment wall 560, top compartment wall 565 (not shown in FIG. 9), rear compartment wall 570, and side panel 510 form an internal compartment 625 which is protected by and contained entirely within panels of the frame. In exemplary embodiments, a portion of a fuel tank for the engine of the power machine is housed within compartment 625. Using this configuration, compartment 625 and the fuel tank contained within the compartment are accessible to the engine compartment but are otherwise closed or protected off from the outside. By forming compartment 625 outside of the inner upright frame wall (i.e. the frame wall comprising panels 416 and 418), but inside of an outer frame wall (e.g. side panel 510), the compartment for the fuel tank can be provided in the upright, which is advantageous as compared to conventional frames. For example, by locating compartment 625 in this position, the fuel tank does not require as much engine compartment space, nor does it increase a size of frame 410. At the same time, the fuel tank remains accessible and protected and the space within the upright is advantageously utilized.

Figures 1, 10:
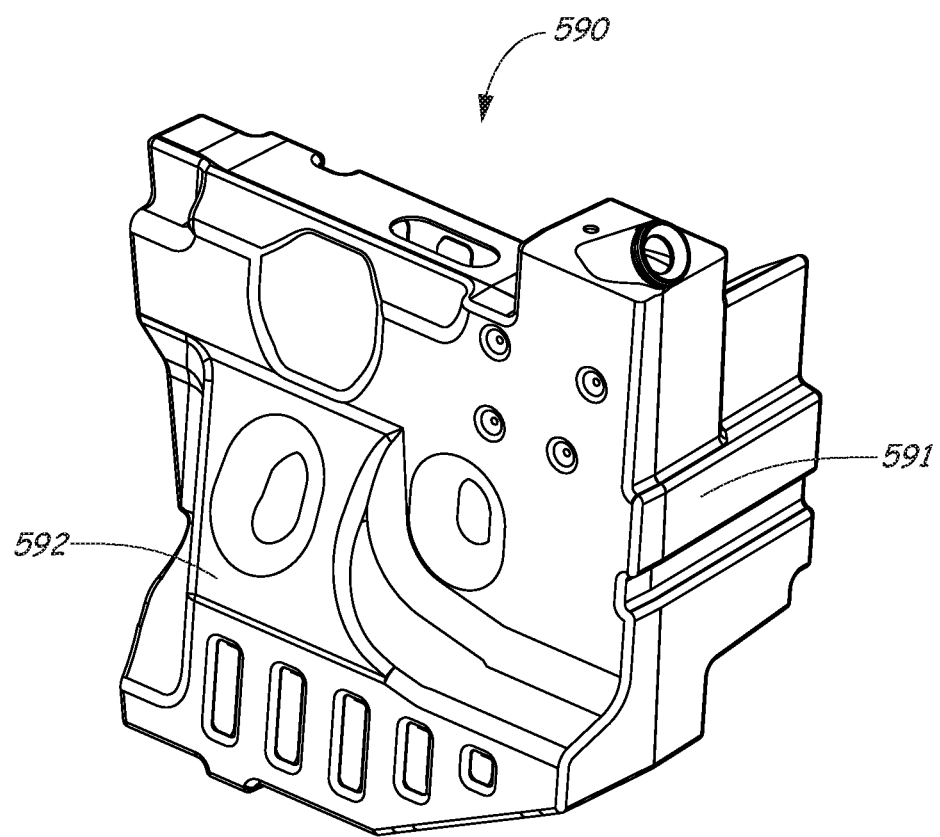
Figures 2, 10:
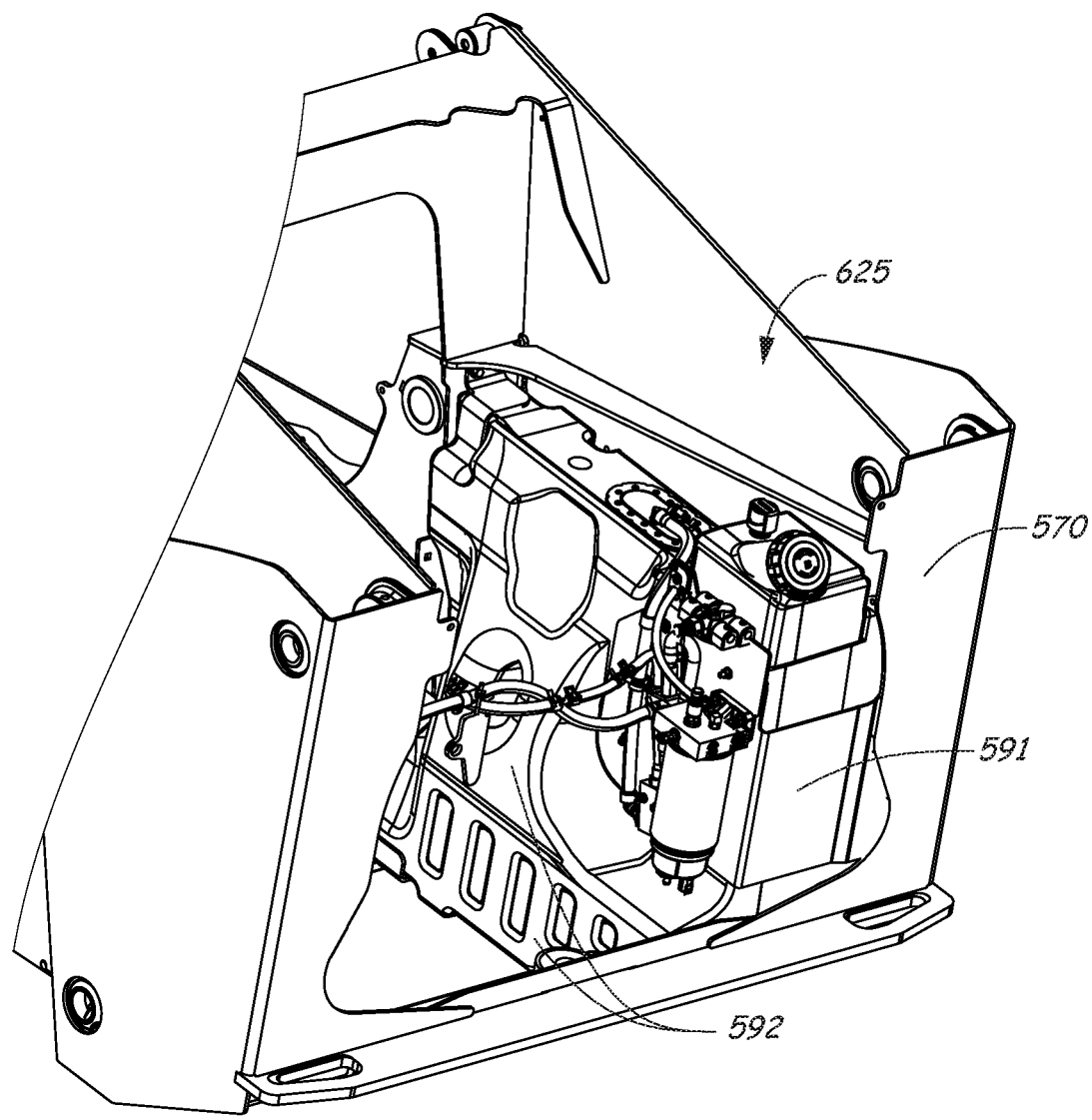
Figures 3, 10:
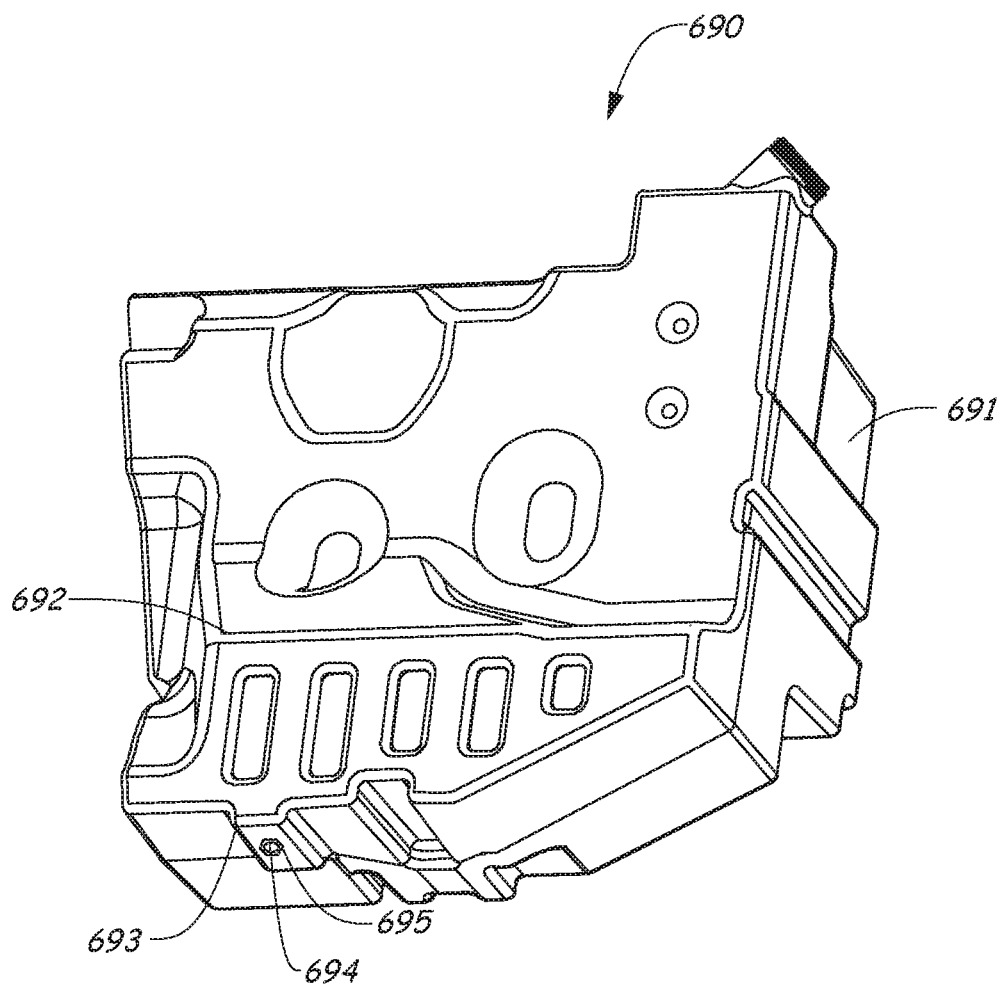
Figures 4, 10:
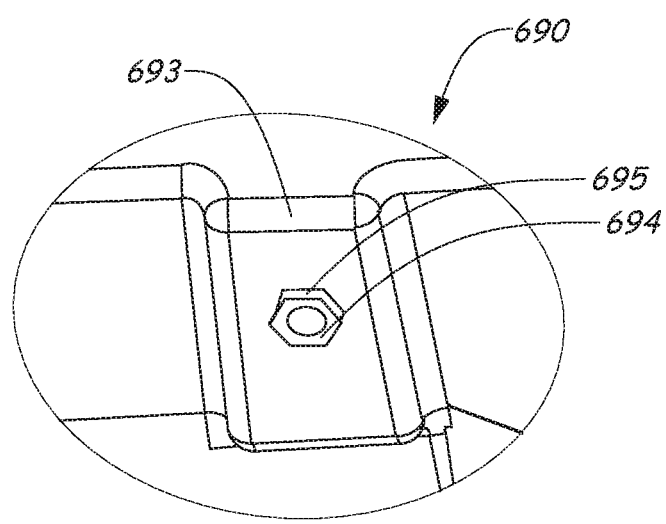
Figures 5, 10:
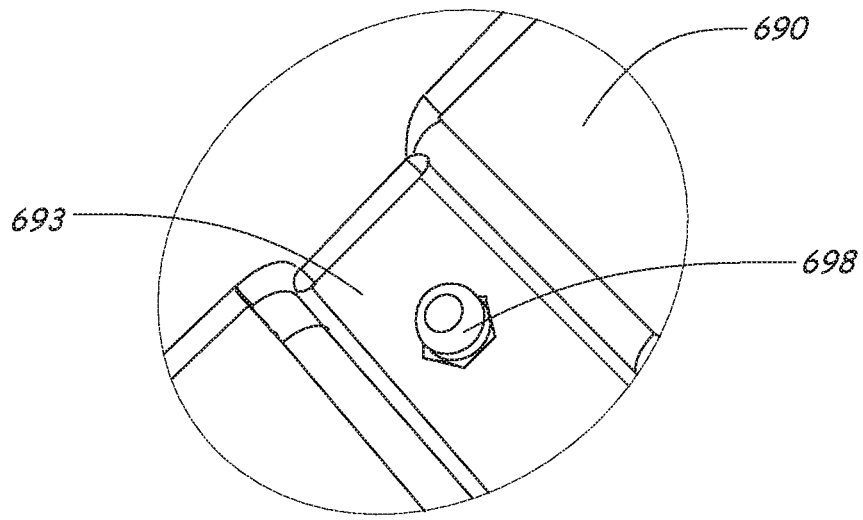
Figures 6, 10:
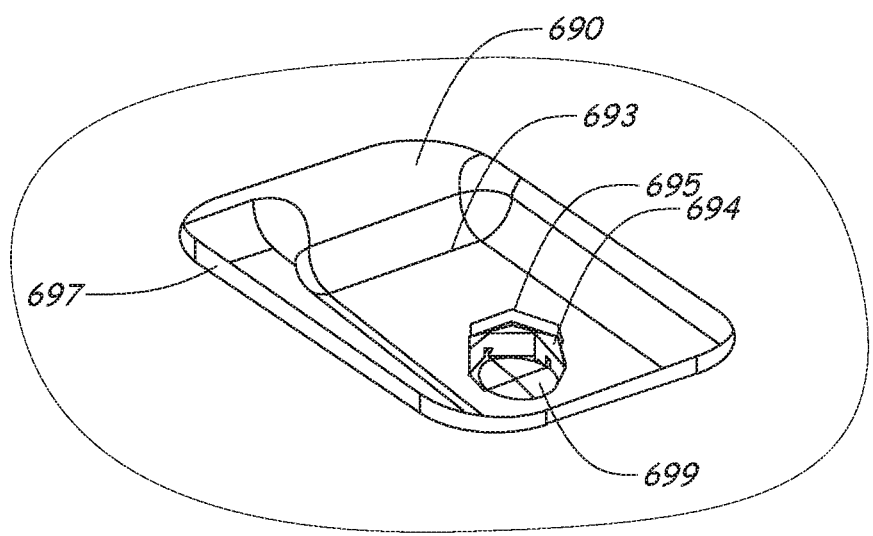
Figures 7, 10:
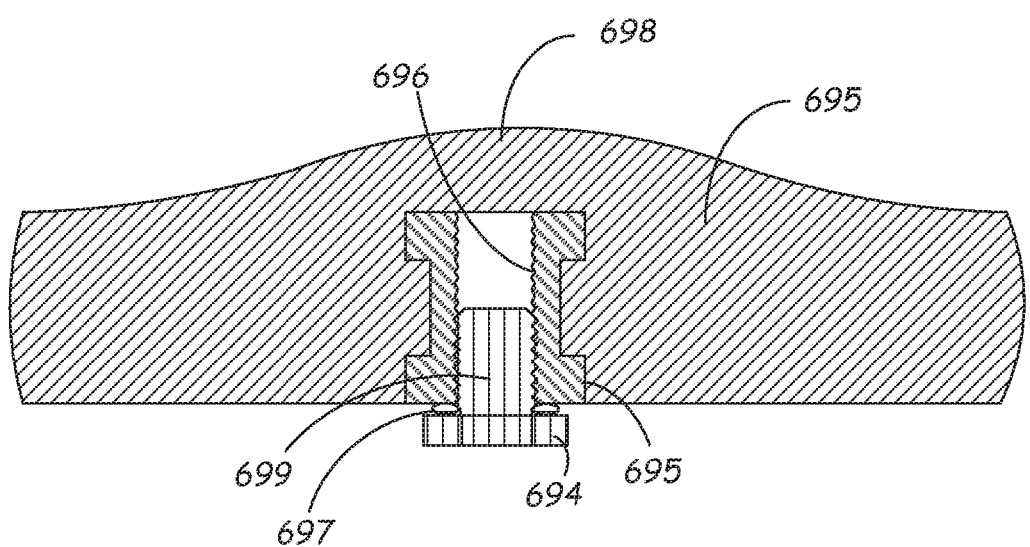

FIGS. 10-1 and 10-2 illustrate a fuel tank 590 having a first portion 591 configured to be positioned within compartment 625, and second portions 592 configured to be positioned outside of compartment 625 next to and/or below portions of the engine 593. In exemplary embodiments, it can be beneficial that compartment 625 is protected from the outside, bottom and top by the frame, but that the compartment 625 is open to the interior of the engine compartment. This allows both access to the compartment and fuel tank positioned within the compartment, and allows portions of the fuel tank to be positioned outside of compartment 625 as shown in FIG. 10-2. Fuel tank 590 is illustratively made from a polymeric material and is molded to fit within the compartment 625 and to extend beneath the engine 593.

Referring now to FIG. 10-3, shown is a bottom perspective view of another fuel tank 690, in accordance with exemplary embodiments, which can incorporate features discussed above with reference to fuel tank 590. Like fuel tank 590, fuel tank 690 can include a first portion 691 configured to be positioned within the compartment 625 discussed above, and a second portion 692 configured to be positioned outside of the compartment 625 next to and/or below portions of the engine 593. However, this configuration is not required in all embodiments.

Fuel tank 690 can be a plastic molded tank, including a plug receptacle 695 formed in the molding process. Receptacle 695 is formed in a drain well 693 or other bottom portion of fuel tank 690 to allow drainage of most fuel within the fuel tank. In some embodiment a receptacle insert 694 is positioned within the plug receptacle 695. The receptacle insert 694 is configured to receive a drain plug 699 (shown in FIGS. 10-6 and 10-7). Receptacle insert 694 can be a threaded insert having threads 696 to allow a threaded drain plug 699 to be secured within the insert 694 and receptacle 695, and to be removed. Receptacle insert 694 can be made of a metallic material, which can advantageously provide a stronger threaded material to engage with the drain plug 699. A seal 697 is provided to prevent leakage of fuel when the cover has been removed and the drain plug 699 is reinserted into the receptacle 695. Seal 697 can be an o-ring or other suitable seal. FIG. 10-4 illustrates an exemplary embodiment of the molded receptacle 695 and the receptacle insert 694 in greater detail.

Referring now to FIG. 10-5, shown is an inside view of drain well 693 of tank 690, with receptacle over-molded portion or cover 698 covering plug receptacle 695. FIG. 10-7 is a cross-sectional illustration of a portion of the fuel tank 690 (e.g., a portion of drain well 693) showing one exemplary embodiment of the molded portion 698 covering the drain plug receptacle 695. The cover 698 is also formed during the molding process which creates fuel tank 690, and seals the plug receptacle 695 from the inside of tank 690. With no aperture into the main portion of the fuel tank on the end of receptacle 695, due to the over-molded or cover portion 698, fuel cannot leak through the plug receptacle, regardless of whether plug 699 (shown in FIG. 10-6) is positioned within the insert 694 and receptacle 695. Thus, while the fuel tank can receive a fuel plug 699 within the receptacle, a fuel leak will not result from plug removal, from an improperly installed plug, or from a damaged plug. In exemplary embodiments, in the event that the tank must be emptied through the plug receptacle, a service person will remove the drain plug 699, and punch out or otherwise remove the over-molded material of cover 698 that seals the tank from the receptacle 695. As a result, risk of leakage is not incurred in order to provide a drain plug which may not be used. FIG. 10-5 also illustrate the small well 693 to allow only a small amount of fuel to be left in the tank 690 after a draining event.

Fuel tank 690 is mounted in a power machine, such as discussed above, so that the plug 699 can be accessed via an access plate from the bottom of the machine. FIG. 10-6 illustrates the tank 690 mounted in the power machine with the access plate removed to allow access to the drain plug 699 through an opening 697 in the frame.

Welded Axle Tube Support and Split Chain Case Design

Figures 3, 11:
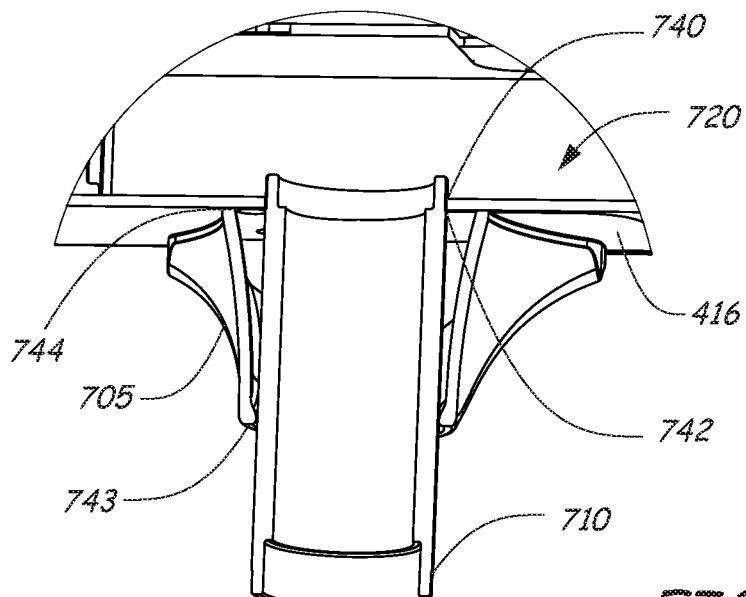
Figures 4, 11:
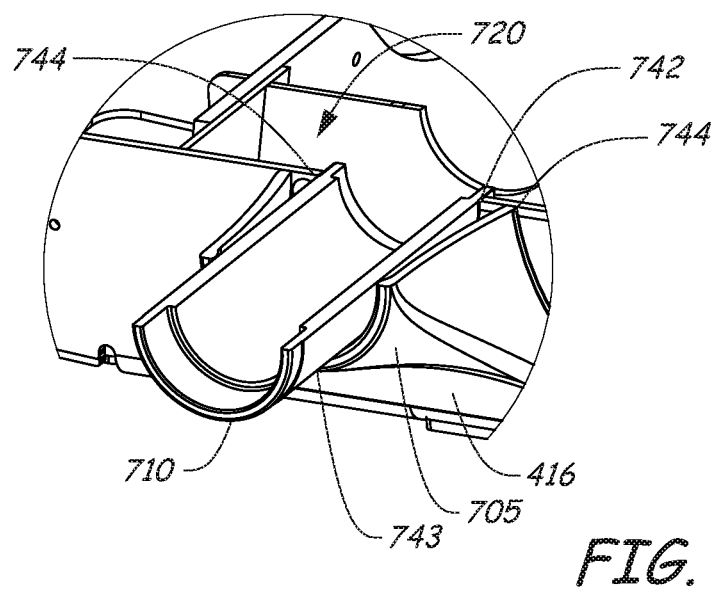
Figure 12:
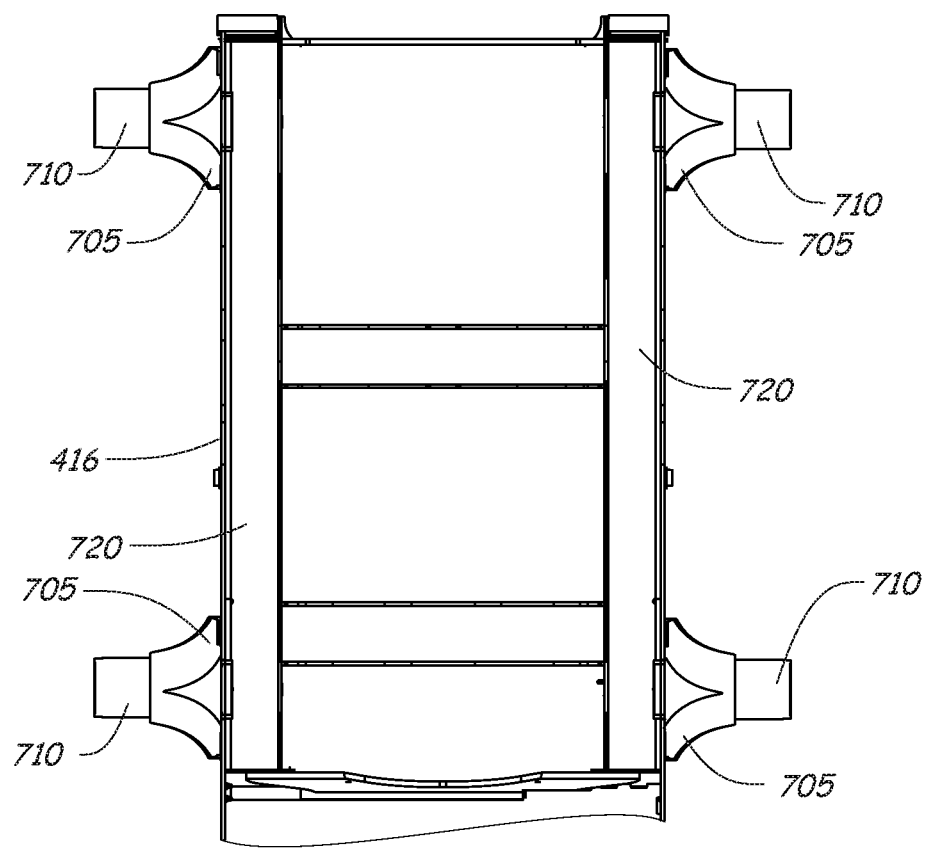
FIG. 12 is a top view of a portion of the power machine frame.
Figure 13:
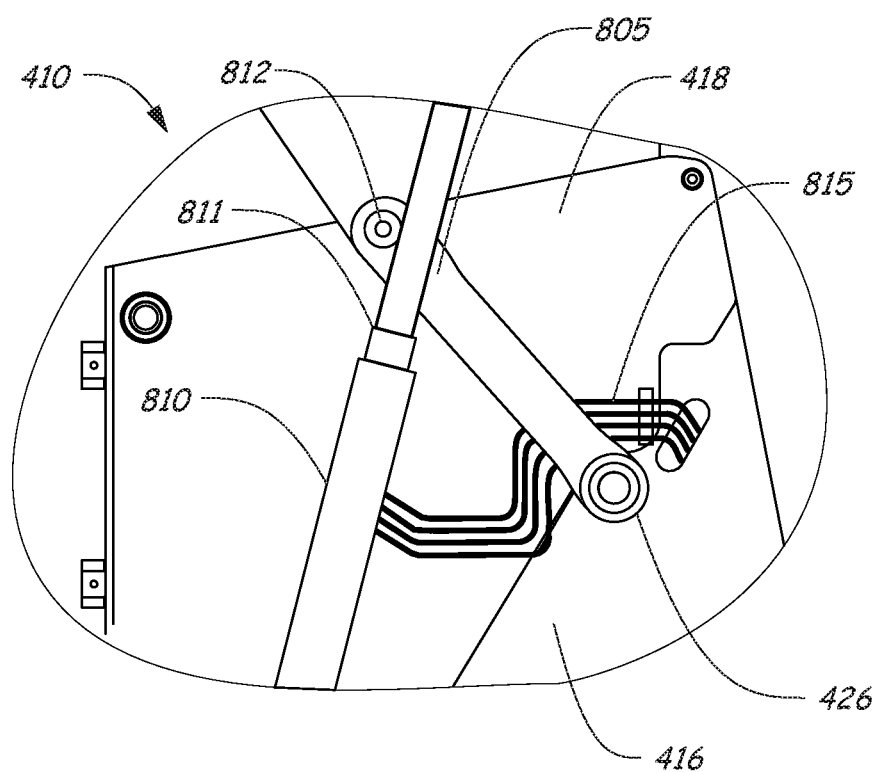
FIG. 13 is a side view illustration of a portion of a power machine and the disclosed frame illustrating a frame configuration which facilitates positioning of a lift cylinder outside of a lift arm link and routing of hydraulic hoses inward of the lift arm link.

FIGS. 11-1 through 11-4, illustrate perspective and top views of portions of frame 410 illustrating features of some exemplary embodiments in which cast axle tube supports 705 are welded to portions of panel 416 that form an outer chain case wall of a chain case 720 on both sides of the frame in a split chain case design. Skid steer loaders typically have a single drive motor coupled to both axles on each side of the frame. Each drive motor is typically coupled to the axles by chains that are driven by sprockets directly coupled to an output shaft of the drive motor. Various sprocket and chain arrangements can be used and are not shown here because the specific chain drive arrangement that might be used in a given embodiment is not germane to the discussion. Some skid steer loaders have a single chain case in which the chain drives for each side of the loader are contained. In the embodiments shown herein, chain cases 720 are located on each side (hence the use of the split chain case nomenclature referred to above) of the frame 410. The cast axle tube support 705 has an aperture 706 through which an axle tube 710 extends. FIGS. 11-2 through 11-4 illustrate portions of the axle tubes, the axle tube supports, and the split chain cases. During manufacture of frame 410, axle tube 710 can be welded to either an inside surface 740 of panel 416 (e.g., an inner surface of the outer wall of chain case 720) or to an outside surface 742 of panel 416. Axle tube 710 can also be welded to support 705 at aperture 706. Support 705 is welded to an outside surface 744 of panel 416. Using cast axle tube supports 705 welded to panel 416 over apertures 422 and 424 discussed above with reference to FIG. 4 provides support for axles 710. By having supports 705 welded to the frame, the axles are positively mounted and cannot be moved. This arrangement advantageously provides a positive positioning of the axle tubes 710 over prior art designs that allow for adjustment—and possible misadjustment—of the axle tubes on machines with split chain cases. FIG. 12 is a top view of a portion of frame 410 illustrating the axle tube support features discussed above.

Lift Cylinder and Link Configuration

Figures 1, 14:
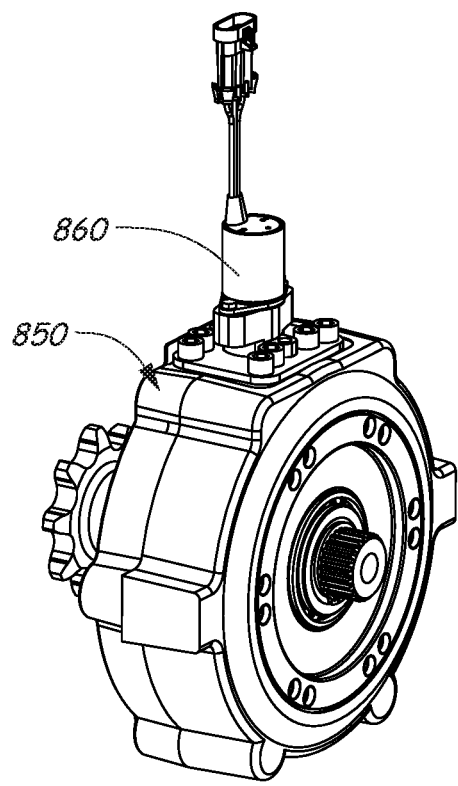
Figures 2, 14:
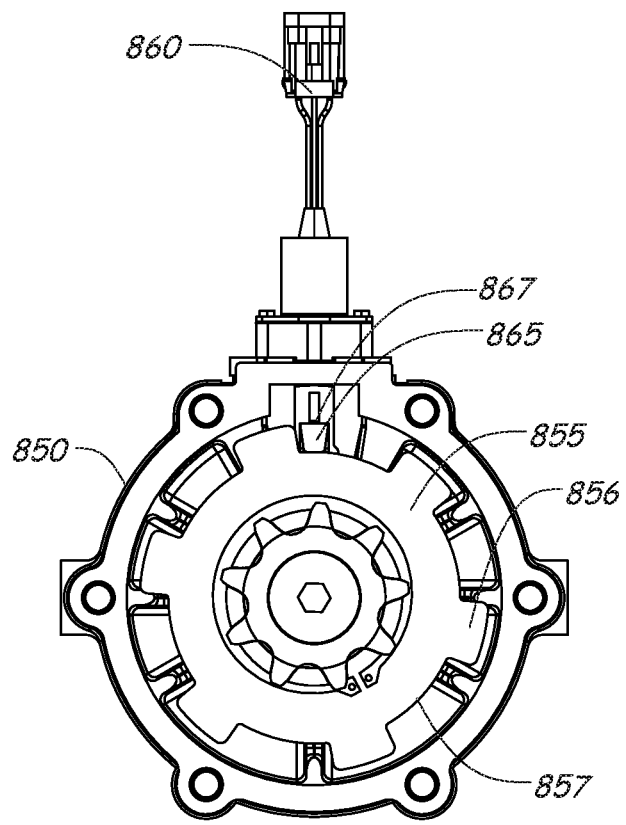
Figures 3, 14:
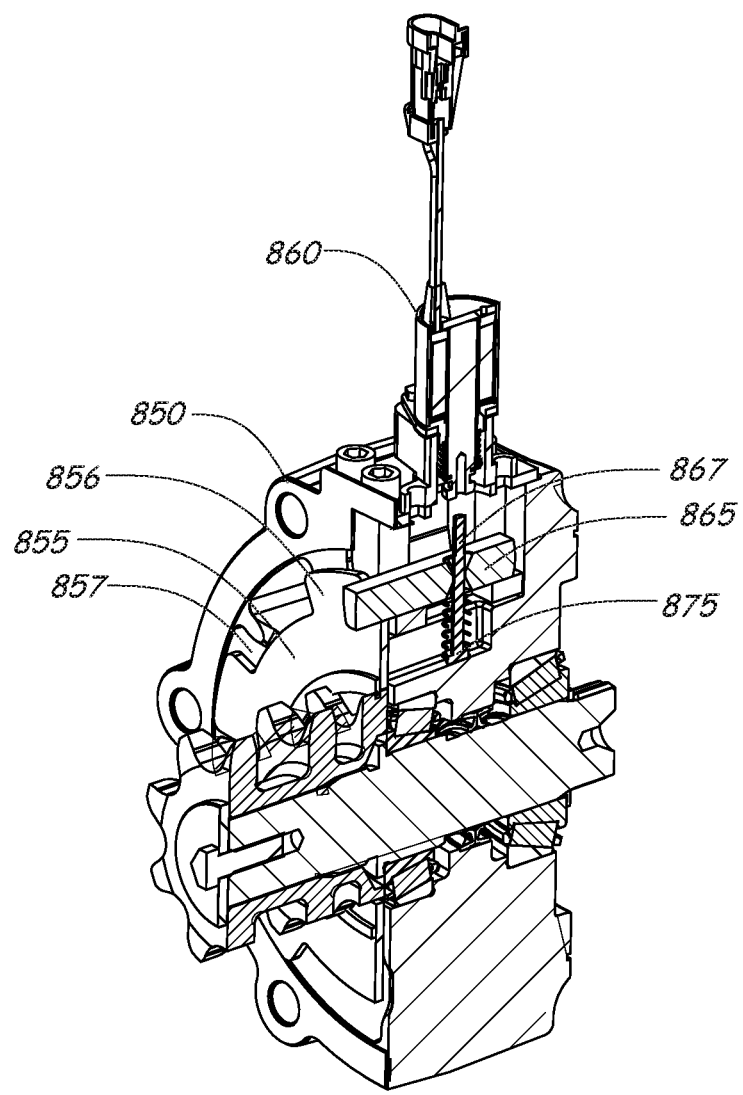

FIG. 14 is a side view illustration of a portion of the power machine and the disclosed frame 410. As shown in FIG. 14, in an example embodiment lift arm position indexing aperture 426 is an aperture for a pivot connection of a lift arm link member 805. Link member 805 is, for example, a driver or control link for the lift arm. Also shown in FIG. 14, a lift cylinder 810 is connected to frame 410, for example at lift arm position indexing aperture 428 (not shown in FIG. 14) outside or outwardly (relative to the frame side panels 416 and 418) of link member 805. In exemplary embodiments, the link member 805, lift cylinder 810, and corresponding pivot connections are positioned such that a top 811 of the lift cylinder remains below an upper pivot connection 812 of the link member 805 and the lift cylinder and link member rotate during raising and lowering of the lift arm. Among other benefits, this allows closer positioning between link member 805 and lift cylinder 810 such that hydraulic conduits 815 (for lift cylinder 810 and for a tilt cylinder which is not shown in FIG. 14) can be routed along the side panels of frame 410 inward of linkage 805. Thus, space saving is achieved, and the manufacturing process is simplified.

Motor Carrier Traction Lock

As discussed above, a split chain case design is incorporated into various embodiments of frames for power machines such as skid steer loaders. As discussed above, axles on each side of a skid steer loader are typically coupled to a single drive motor via chains. In such embodiments, each chain case houses a motor carrier to carry the motor that engages the sprocket/chain arrangement within the chain case. An exemplary motor carrier 850 for use in each of the two chain cases is shown in FIGS. 14-1 through 14-3. Motor carrier 850 includes a wedge brake controlled by a solenoid 860 mounted on the motor carrier. With separate motor carriers incorporating wedge brakes in the split chain cases, the traction system of each side of the power machine is locked independently.

Figure 15:
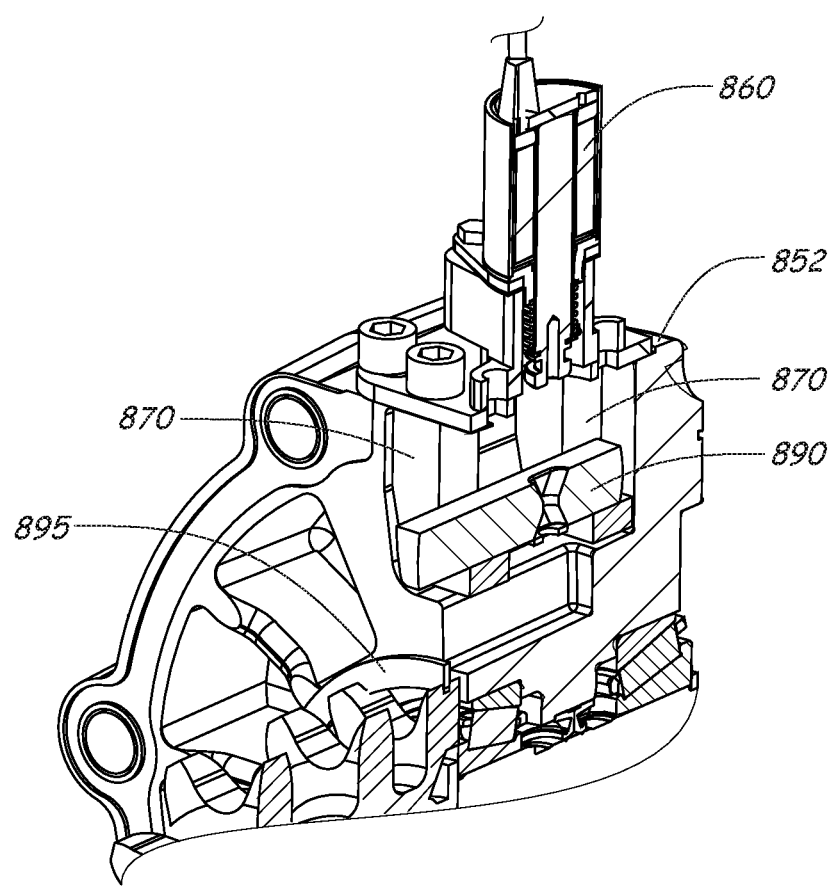
FIG. 15 is an illustration of a portion of a motor carrier having a formed brake disc according to an alternative embodiment.

FIGS. 14-2 and 14-3 illustrate a first configuration of the motor carrier and wedge brake design in which the wedge brake disk 855 is offset from the motor carrier and the wedge 865, which engages disk 855, is cantilevered such that an engagement portion of the wedge can engage the disk. As can be seen in FIGS. 15-2 and 15-3, disk 855 includes tabs 856 and recesses 857 between the tabs for engaging the wedge 865. Guides 870 positioned within the motor carrier 850 aid in positioning wedge 865, while one or more springs bias an engagement portion of the wedge, outside the guides 870, into a position in a recess 857. Note that the bias springs are not shown in the figures, and illustrated spring 875 is positioned opposite the biasing spring or springs which bias the wedge into a recess 857. With cantilevered wedge 865 spring loaded into the locked position in a recess 867 of the disk 855, solenoid 860 is activated and to unlock the brake by lifting the wedge, using a wedge engagement mechanism 867, and overcoming the biasing spring force.

In an alternative embodiment of a motor carrier 852 shown in FIG. 15, the wedge 890 is supported by guides 870, but is not cantilevered and instead the entire wedge moves down under the influence of the bias spring(s) to engage the lock, and up under the influence of solenoid 860 to disengage the lock. To accommodate the non-cantilevered design of wedge 890, disk 895 is shaped to fit into the motor carrier 852, with the engagement portion of wedge 890 being positioned between guides 870.

Although the present invention has been described by referring to preferred embodiments, workers skilled in the art will recognize that changes may be made in form and detail without departing from the spirit and scope of the invention.

What is claimed is:

1. A fuel tank assembly for a power machine, comprising:
    a molded fuel tank;
    a plug receptacle formed in a bottom portion of the fuel tank;
    a molded cover formed inside the fuel tank above the plug receptacle and sealing an interior of the fuel tank from the plug receptacle;
    a receptacle insert positioned inside of the plug receptacle; and
    a fuel plug configured to be removably secured within the receptacle insert;
    wherein the molded cover prevents leakage from inside the fuel tank through the plug receptacle, regardless of whether the plug is secured within the receptacle insert, unless the molded cover has been removed from a sealing position.

2. The fuel tank assembly of claim 1, wherein the plug receptacle is formed in a drain well to allow drainage of fuel in the fuel tank.

3. The fuel tank assembly of claim 1, wherein the molded fuel tank is made of polymeric material.

4. The fuel tank assembly of claim 3, wherein the molded fuel tank and molded cover are formed in a same molding process such that the fuel tank and molded cover are formed of a continuous piece of polymeric material.

\* \* \* \* \*